(12) United States Patent
Takeda

(10) Patent No.: US 6,374,166 B1
(45) Date of Patent: Apr. 16, 2002

(54) CONTROL SYSTEM FOR A FUEL CELL VEHICLE HAVING AN EXHAUST HYDROGEN COMBUSTOR

(75) Inventor: Yasushi Takeda, Kawasaki (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/564,985

(22) Filed: May 5, 2000

(30) Foreign Application Priority Data

May 6, 1999 (JP) ............................................ 11-126033

(51) Int. Cl.$^7$ .......................... H01M 8/00; H01M 8/04; G05F 1/67; B60L 11/18
(52) U.S. Cl. ........................ 701/22; 180/65.1; 180/65.3; 429/19
(58) Field of Search ............................ 701/22; 180/65.1, 180/65.3; 429/19

(56) References Cited

U.S. PATENT DOCUMENTS

| | | | |
|---|---|---|---|
| 4,904,548 A | * 2/1990 | Tajima | 429/22 |
| 5,009,967 A | * 4/1991 | Scheffler | 429/23 |
| 5,646,852 A | * 7/1997 | Lorenz et al. | 364/431.051 |
| 5,771,476 A | * 6/1998 | Mufford et al. | 701/22 |
| 5,991,670 A | * 11/1999 | Mufford et al. | 701/22 |
| 6,186,854 B1 | * 2/2001 | Mufford et al. | 180/65.3 |

* cited by examiner

*Primary Examiner*—Michael J. Zanelli
*Assistant Examiner*—Eric M Gibson
(74) *Attorney, Agent, or Firm*—Foley & Lardner

(57) ABSTRACT

A combustion temperature (Tc) in an exhaust hydrogen combustor (5) is calculated (step S10). An exhaust temperature (Te) of the exhaust hydrogen combustor (5) is detected by a temperature sensor (69) (step S20). An absolute value of the difference between the detected exhaust temperature (Te) and the calculated temperature (Tc) is taken, and if this temperature difference is greater than a prescribed value (T1), a fuel cell system is judged as having an abnormality (step S40) so that the vehicle should be stopped. If the temperature difference, however, is not greater than another prescribed value (T2), which is greater than the former value (T1), a switch is made to limp-home control.

5 Claims, 5 Drawing Sheets

STACK CONSUMED HYDROGEN MAP

CONTROL SYSTEM FOR A FUEL CELL VEHICLE HAVING AN EXHAUST HYDROGEN COMBUSTOR

BACKGROUND OF THE INVENTION

The present invention relates to a control system for a fuel cell vehicle having an exhaust hydrogen combustor, in which it is monitored whether or not the combustion temperature in the exhaust hydrogen combustor is within a prescribed range, for a quick detection of a temperature abnormality in the exhaust hydrogen combustor, to thereby enable an appropriate action to be taken.

In a fuel-cell vehicle of the past, hydrogen was generated by a reformer, from methanol and water, or from methanol, water, and air, and a stack was used to generate electrical power from the hydrogen and air.

In this type of fuel-cell vehicle, the exhaust hydrogen exhausted from the stack was combusted in an exhaust hydrogen combustor, and exhaust heat from the exhaust hydrogen combustor was used to evaporate methanol and water supplied to an evaporator.

The combustion temperature in an exhaust hydrogen combustor was dependent on the amount of exhaust hydrogen from the stack. In fuel-cell vehicles in the past, however, there was no control performed of the temperature in the exhaust hydrogen combustor. If a problem developed in a fuel cell system, it could happen that the combustion temperature in the exhaust hydrogen combustor became excessively low or excessively high.

SUMMARY OF THE INVENTION

Given the above-noted problem, it is desirable that the combustion temperature of an exhaust hydrogen combustor be controlled if an abnormal combustion temperature occurs therein. It therefor is an object of the present invention to provide a control system for a fuel cell vehicle having an exhaust hydrogen combustor in which, when an abnormality occurs in the exhaust hydrogen combustor, it is possible to change the control mode of the fuel cell vehicle, thereby contributing to the improvement of the reliability of the fuel-cell vehicle.

An aspect of the present invention to achieve the object is a control system for a fuel cell vehicle equipped with a fuel cell system including a reformer which generates hydrogen from methanol and water and/or air, a fuel cell which generates electrical power from the generated hydrogen and air, and an exhaust hydrogen combustor which combusts exhaust hydrogen exhausted from the fuel cell, the control system comprising a calculator which calculates an amount of hydrogen generated, based on amounts of methanol, water, and air supplied to the reformer and a reaction temperature in the reformer, a calculator which calculates an amount of hydrogen consumed, based on a voltage and a current generated by the fuel cell, a calculator which calculates an amount of hydrogen exhausted by subtracting the consumed amount of hydrogen from the generated amount of hydrogen, a calculator which calculates a combustion temperature in the exhaust hydrogen combustor, based on the exhausted amount of hydrogen, a calculator which calculates a temperature difference between the calculated combustion temperature and a detected temperature of the exhaust hydrogen combustor, a decider which decides that the exhaust hydrogen combustor be abnormal with respect to combustion temperature, when the calculated temperature difference exceeds a first prescribed value, and a controller which controls the fuel cell vehicle to be driven in dependence on a decision of the decider.

According to this aspect of the present invention, the temperature difference between an calculated combustion temperature and a detected temperature is compared with a prescribed reference temperature difference used as a criterion. If this prescribed reference temperature difference is exceeded, a decider makes the judgment that an abnormality has occurred in the combustion temperature, and in response thereto a controller controls the fuel cell vehicle, thereby improving the operating reliability of the fuel cell vehicle.

BRIEF DESCRIPTION OF THE DRAWINGS

The above and further objects and novel features of the present invention will more fully appear from the following detailed description when the same is read in conjunction with the accompanying drawings, in which.

DESCRIPTION OF THE PREFERRED EMBODIMENTS

Preferred embodiments of the present invention are described in detail below, with reference made to relevant accompanying drawings.

Figure 1:
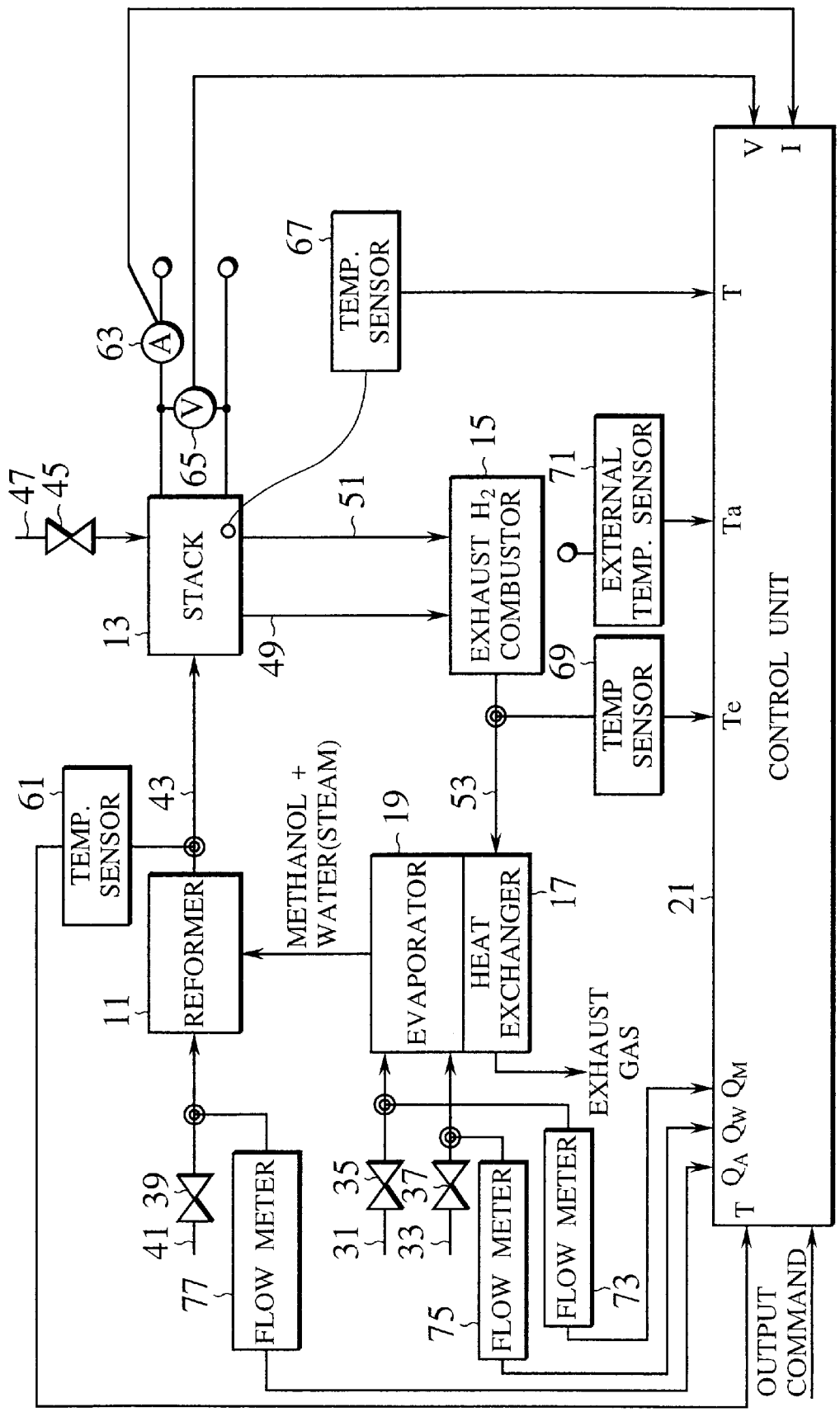
FIG. 1 is a drawing showing the configuration of a fuel cell system to which can be adapted a control system for a fuel cell vehicle according to a first embodiment of the present invention.

FIG. 1 shows the configuration of a fuel cell system to which can be adapted a control system for a fuel cell vehicle equipped with a fuel cell system according to the first embodiment of the present invention.

This fuel cell system, as shown in FIG. 1, has a reformer 11, a stack 13, an exhaust hydrogen combustor 15, a heat exchanger 17, an evaporator 19, and a control unit 21, and uses methanol as a fuel.

In FIG. 1, methanol 31 and water 33 are supplied from a supply apparatus (not shown in the drawing) and pass through valves 35 and 37 so as to be supplied to the evaporator 19, and flow into the reformer 11 in a vaporized condition. In the reformer 11, when air 41 is supplied via the valve 39, the methanol and water or methanol, water, and air react, so as to generate hydrogen 43, which flows to the stack 13. At the stack 13, air 47 is supplied via the valve 45, and hydrogen and oxygen react to generate electrical power. Exhaust hydrogen 49 and exhaust air 51 exhausted from the stack 13 are combusted in the exhaust hydrogen combustor 15. The exhaust gas 53 from the exhaust hydrogen combustor 15 passes through the heat exchanger 17 and is exhausted to the outside atmosphere. At the heat exchanger 17, heat obtained from the exhaust gas 53 is used to raise the temperature of the evaporator 19, at which the methanol 31 and water 33 are vaporized.

The reaction temperature of the stack 13 is detected by a temperature sensor 61. The voltage and the current of the electrical power generated at the stack 13 are detected by the ammeter 63 and the voltmeter 65, and this electrical power is supplied to a battery or a motor (not shown in the drawing). The temperature of the stack 13 is detected by a temperature sensor 67. The temperature of the exhaust hydrogen combustor 15 is detected by a temperature sensor 69. The ambient temperature in the area surrounding the exhaust hydrogen combustor 15 is detected by the temperature sensor 71. The flow-in rate of the methanol 31 is measured by the flow meter 73. The flow-in rate of the water 33 is measured by the flow meter 75. The flow-in rate of the air 41 is measured by the flow meter 77. The values measured by these sensors are sent to the control unit 21.

At the control unit 21, in response to operation of an accelerator by an vehicle operator, in accordance with an output command in accordance with power distribution between a battery (not shown in the drawing) and the stack 13 control is performed of the amounts of methanol 31, water 33, and air 41 and 47 that are supplied.

Figure 2:
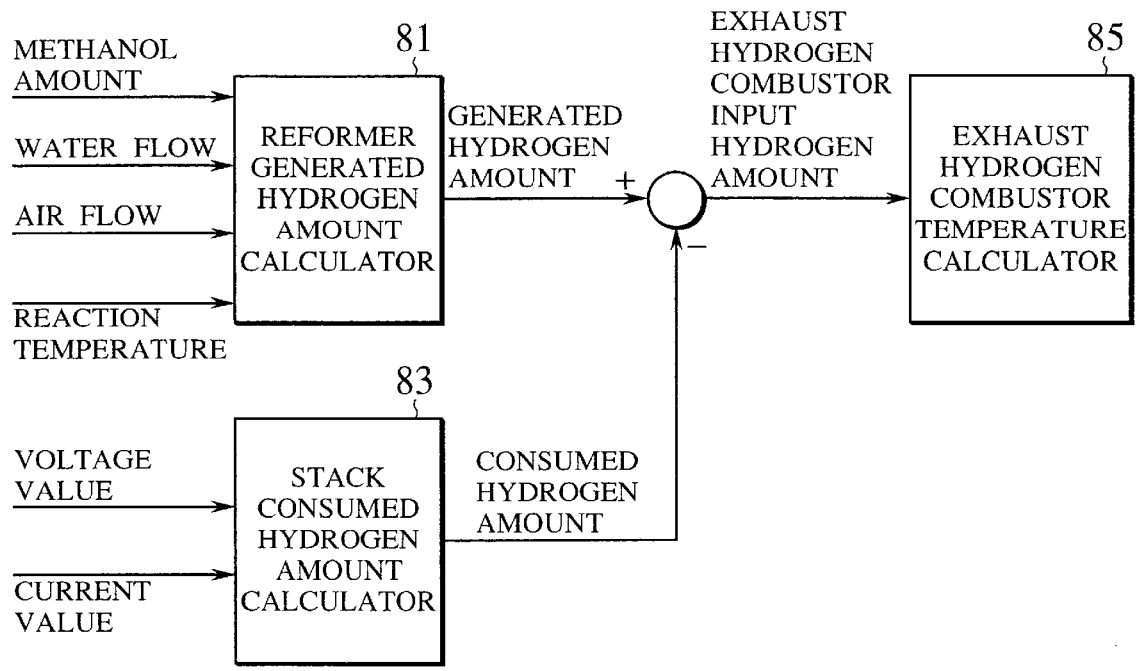
FIG. 2 is a block diagram of a software module executed by a control unit 21 for calculateing the exhaust temperature of an exhaust hydrogen combustor.

The basic operation of the control unit 21 with regard to the exhaust hydrogen combustor 15 is as follows. The elements shown in FIG. 2 are software modules that are executed by the control unit 21 to calculate the exhaust temperature of the exhaust hydrogen combustor 15.

At the reformer generated hydrogen amount calculator 81, the amount of hydrogen generated in the reformer 11 is calculated, based on the amount of methanol flow measurement by the flow meter 73, the amount of water flow measured by the flow meter 75, the amount of air flow measured by the flow meter 77, and the reaction temperature in the reformer detected by the temperature sensor 61. There are cases in which air is not used in the reformer 11.

At the stack hydrogen consumption amount calculator 83, the amount of hydrogen consumed is calculated, based on the output voltage V and the output current I measured by the voltmeter 65 and the ammeter 63. The amount of hydrogen introduced into the exhaust hydrogen combustor is calculated by subtracting the amount of hydrogen consumed in the stack 13 from the amount of hydrogen generated in reformer. At the exhaust hydrogen combustor temperature calculator 85, the heat of combustion in the exhaust hydrogen combustor 15 is calculated, based on the amount of hydrogen introduced into the exhaust hydrogen combustor.

Figure 3:
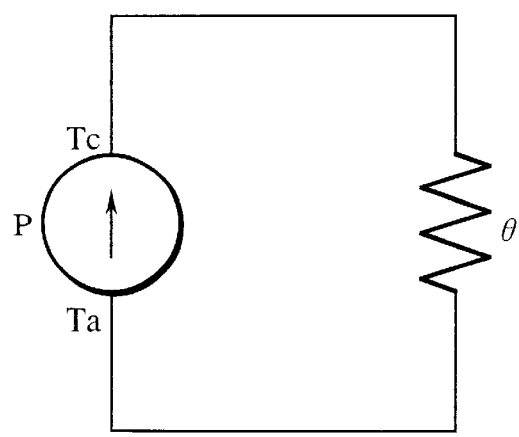
FIG. 3 is an equivalent thermal circuit, in which the area surrounding an exhaust hydrogen combustor ranges in temperature from an ambient temperature Ta to the combustion temperature Tc.

FIG. 3 is an equivalent thermal circuit, in which the area surrounding the exhaust hydrogen combustor ranges in temperature from an ambient temperature of Ta to a combustion temperature of Tc.

In FIG. 3, given a thermal resistance of $\theta$ (° C./W) between the combustion part and the outer atmosphere, a heat of combustion P (W) determined from the amount of hydrogen introduced into the exhaust hydrogen combustor, and the ambient temperature Ta in the area surrounding the exhaust hydrogen combustor 15, the temperature Tc of the combustor is calculated as follows.

$$Tc = P \cdot \theta + Ta \quad (1)$$

Figure 4:
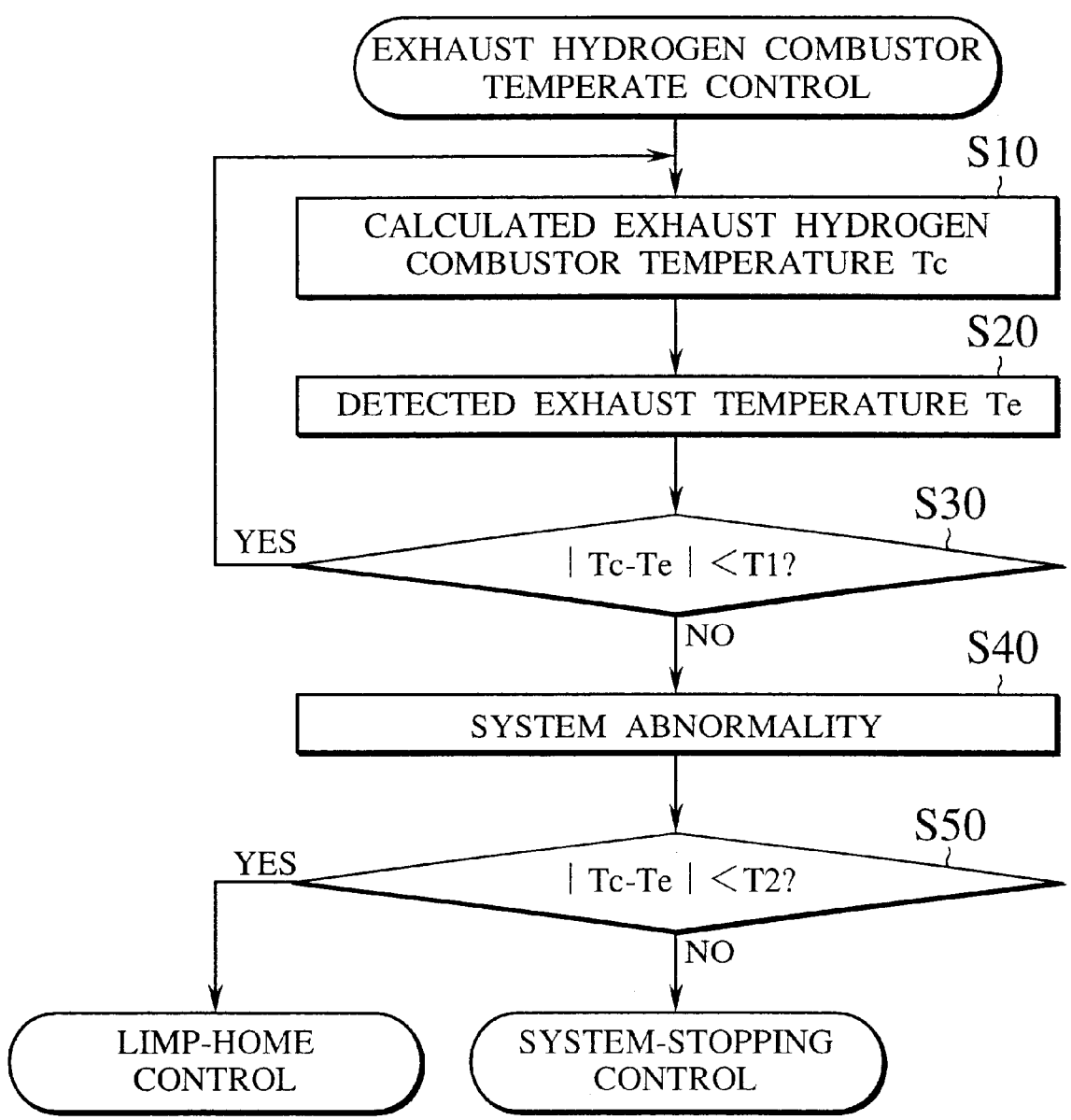
FIG. 4 is a flowchart showing the process of sensing an abnormality in the exhaust hydrogen combustor.

Referring to the flowchart of FIG. 4, the process of sensing an abnormality in the exhaust hydrogen combustor 15 is as follows.

First, at step S10, the calculation of Equation (1) is performed to calculate the temperature Tc of combustion in the exhaust hydrogen combustor 15. Then, at step S20, the exhaust gas temperature Te from the exhaust hydrogen combustor 15 is detected by the temperature sensor 69. At step S30, the absolute value of the difference between the exhaust gas temperature Te and the calculated value of Tc is taken, and a test is made as to whether this is within a prescribed value T1, that is, whether it satisfies the following relationship.

$$|Tc - Te| < T1 \quad (2)$$

If the temperature difference is less than T1, the system is taken to be operating normally, and return is made to step S10, from which the monitoring process is repeated.

If the temperature difference was not less than T1, however, the system is taken as exhibiting an abnormality, and processing control proceeds to step S40. It is further possible to provide an LED or the like that indicates a system abnormality on the instrument panel forward of the driver's seat, this indicator being lighted to inform the driver of a system abnormality.

At step S30, by testing whether the difference between the detected exhaust temperature value Te and the calculated value Tc is within a prescribed value, a verification is made generation of hydrogen in the reformer, the power consumption of the stack 13, the combustion in the exhaust hydrogen combustor 15, and also of the proper operation of the associated sensors and actuators.

Thus, when the temperature difference exceeds the prescribed value T1, the judgment is made that the combustion temperature in the exhaust hydrogen combustor is abnormal, thereby making it possible to detect an abnormality not only in the exhaust hydrogen combustor, but also in the fuel cell, or in a temperature sensor, thereby contributing to an improvement in the reliability of the fuel cell vehicle.

At step S50, a further test is made as to whether the temperature difference is within the other prescribed reference value T2. If the temperature difference is within the value T2, a switch is made to a limp-home control, which is a turn-down mode of drive control. The limp-home control enables driving to continue by lowering the output to a pre-established value, thereby enabling the continued low-output operation of the vehicle without having to stop operation of the system immediately upon detecting a system abnormality, thereby improving the reliability of the fuel cell vehicle.

If the temperature difference is determined at step S50 to be greater than the prescribed reference value T2, however, a switch is made to control for stopping the system. Because system stopping control stops the supply of electrical power to the system, to ensure vehicle safety, the driver of the vehicle is first notified that the system is being stopped, after which the supply of methanol 31 and water 33 to the evaporator 19 is stopped, and then the supply of air 41 to the reformer 11 is stopped. As a result, there is a gradual reduction in the electrical power output of the stack 13, until the system is stopped.

Thus, if an abnormality is detected in the combustion temperature of the exhaust hydrogen combustor, and the temperature difference exceeds the second prescribed reference value T2, which is greater than the first prescribed reference value T1, a switch is made from limp-home control to system stopping control, so that even if an abnormality occurs in the exhaust hydrogen combustor it is possible to successively change operational control of the fuel cell vehicle in response to the severity of the problem.

Thus, by stopping the engine only in the case in which there is the possibility of damage to the exhaust hydrogen combustor, the fuel cell, or a temperature sensor, it is possible even in the limp-home control mode to improve the reliability of the fuel cell vehicle.

Figure 5:
FIG. 5 is a drawing showing the absolute values of the temperature range representing the operating conditions of the exhaust hydrogen combustor.
Figure 5:
Figure 6:
FIG. 6 is a drawing showing the temperature range representing the operating condition.
Figure 6:
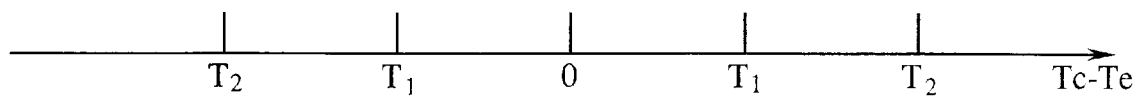

It should be understood that in the above-described embodiment at steps S30 and S50 the absolute value of the temperature difference between the detected exhaust temperature Te and the calculated value Tc is taken, the operation condition of the exhaust hydrogen combustor 15 being ascertained by observing on what part of the temperature line of FIG. 5 that difference falls, it is alternatively possible to make this determination in terms with respect to a signed reference value.

A second embodiment is applicable to the fuel cell system of the first embodiment shown in FIG. 1, the description of which is omitted herein.

Figure 7:
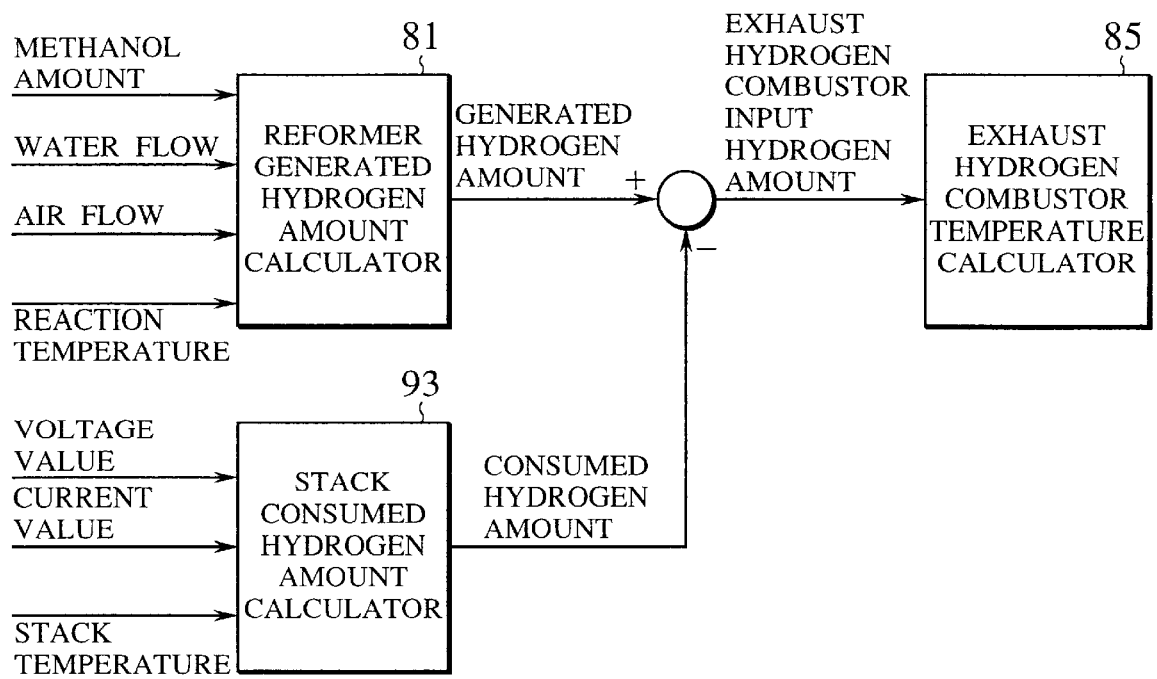
FIG. 7 is a block diagram of a software module executed by a control unit 21 for calculateing the exhaust temperature of an exhaust hydrogen combustor.

The elements shown in FIG. 7 are software modules that are executed by the control unit 21 to calculate the exhaust temperature of the exhaust hydrogen combustor 15, a feature of this embodiment being that the consumed hydrogen amount calculator 83 shown in FIG. 2 is replaced by a stack consumed hydrogen amount calculator 93.

Figure 8:
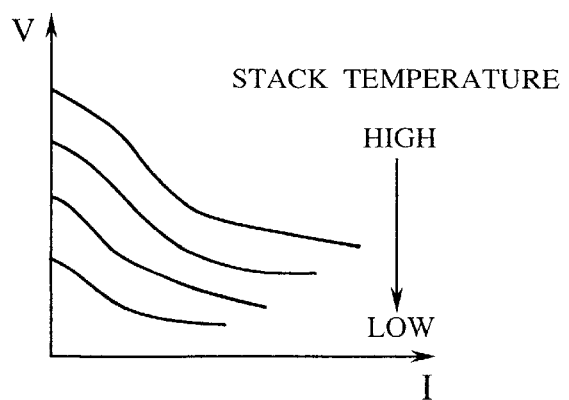
FIG. 8 is a drawing showing the hydrogen consumption map of a stack.

The voltage V and current I that can be output from the stack 13 generally varies in accordance with the hydrogen consumption map of the stack shown in FIG. 8.

The output voltage V and the current I of the stack 13, and the amount of hydrogen consumption for a stack temperature of T are pre-set into the stack consumed hydrogen amount calculator 93, this information being stored into an internal ROM of the control unit 21 as a stack consumed hydrogen map.

The calculation of the heat of combustion in the exhaust hydrogen combustor is performed by the control unit 21 as follows.

At the stack consumed hydrogen amount calculator 93, the amount of hydrogen consumed in the stack 13 is calculated, with reference to the stack consumed hydrogen map of FIG. 8, based on the voltage V and current I measured by the voltmeter 65 and ammeter 63, and the stack temperature T.

As noted above, the amount of exhaust hydrogen introduced into the exhaust hydrogen combustor is calculated by the reformer generated hydrogen amount calculator 81 by subtracting the amount of hydrogen consumed in the stack 13 from the amount of hydrogen generated by the reformer. At the exhaust hydrogen combustor temperature calculator 85, the heat of combustion in the exhaust hydrogen combustor 15 is calculated, based on the amount of hydrogen introduced into the exhaust hydrogen combustor 15.

Thus, by compensating the amount of hydrogen consumed using the temperature T of the stack 13, it is possible to accurately calculate the amount of hydrogen consumed in the fuel cell. As a result, even when shifting from system startup to the steady-state condition, it is possible to reliably sense if an abnormality has occurred in the exhaust hydrogen combustor, and to appropriately change the operational control of the fuel cell vehicle, thereby contributing to an improvement in the reliability of the fuel cell vehicle.

In the embodiments described, the operation controller changes from normal driving control to limp-home control when the abnormality sensor senses that an abnormality has occurred in the combustion temperature in the exhaust hydrogen combustor.

With the above-noted refinement, upon judgment that a combustion temperature abnormality has occurred, the normal running control is changed to limp-home control, thereby lowering the output to a pre-established value as the vehicle operation is continued. As a result, it is possible to avoid having to immediately stop the vehicle after the detection of an abnormality, thereby improving the reliability of the fuel cell vehicle.

The controller changes control mode from the limp-home mode to a system-stopping mode, when an abnormality has occurred in the combustion temperature in the exhaust hydrogen combustor, and the calculated temperature difference exceeds a second prescribed value, which is larger than the first prescribed value.

Accordingly, there are enabled successive changes in the control mode, in accordance with the severity of the abnormality of operation in the fuel cell vehicle, and thereby improving the reliability of the fuel cell vehicle.

Further, the system has a detector for detecting a temperature of the fuel cell, and the consumed hydrogen amount calculator uses the detected fuel cell temperature to compensate the amount of consumed hydrogen originally calculated.

Accordingly, it is possible to perform high-accuracy calculateion of the amount of hydrogen consumed.

The contents of Japanese Patent Application 11-126033 are incorporated herein by reference.

While the present invention has been described using specific terms, such description is for illustrative purposes, and it is to be understood that changes and variations may be made without departing from the spirit or scope of the following claims.

What is claimed is:

1. A control system for a fuel cell vehicle equipped with a fuel cell system including a reformer which generates hydrogen, a fuel cell which generates electrical power from the generated hydrogen, and an exhaust hydrogen combustor which combusts exhaust hydrogen exhausted from the fuel cell, the control system comprising:

a first calculator which calculates an amount of hydrogen generated and a reaction temperature in the reformer;

a second calculator which calculates an amount of hydrogen consumed, based on a voltage and a current generated by the fuel cell;

a third calculator which calculates an amount of hydrogen exhausted by subtracting the consumed amount of hydrogen from the generated amount of hydrogen;

a fourth calculator which calculates a combustion temperature in the exhaust hydrogen combustor, based on the exhausted amount of hydrogen;

a fifth calculator which calculates a temperature difference between the calculated combustion temperature and a detected temperature of the exhaust hydrogen combustor;

a decider which decides that the exhaust hydrogen combustor be abnormal with respect to combustion temperature, when the calculated temperature difference exceeds a first prescribed value; and a controller which controls the fuel cell vehicle to be driven in dependence on a decision of the decider.

2. A control system according to claim 1, wherein the controller controls the fuel cell vehicle in a turn-down mode in response to a decision of the decider that the exhaust hydrogen combustor is abnormal with respect to combustion temperature.

3. A control system according to claim 2, wherein the controller controls the fuel cell vehicle in a stopping mode in response to the calculated temperature difference exceeding a second prescribed value greater than the first prescribed value.

4. A control system according to claim 1,
  wherein the control system comprises a detector which detects a temperature of the fuel cell, and
  wherein the third calculator corrects the exhausted amount of hydrogen by using the detected temperature of the fuel cell.

5. A control system for a fuel cell vehicle equipped with a fuel cell system including a reformer for generating hydrogen, a fuel cell for generating electrical power from the generated hydrogen, and an exhaust hydrogen combustor for combusting exhaust hydrogen exhausted from the fuel cell, the control system comprising:
  calculation means for calculating
    an amount of hydrogen generated and a reaction temperature in the reformer,
    an amount of hydrogen consumed, based on a voltage and a current generated by the fuel cell,
    an amount of hydrogen exhausted by subtracting the consumed amount of hydrogen from the generated amount of hydrogen,
    a combustion temperature in the exhaust hydrogen combustor, based on the exhausted amount of hydrogen, and
    a temperature difference between the calculated combustion temperature and a detected temperature of the exhaust hydrogen combustor;
  decision means for deciding that the exhaust hydrogen combustor be abnormal with respect to combustion temperature, when the calculated temperature difference exceeds a first prescribed value; and
  control means for controlling the fuel cell vehicle to be driven in dependence on a decision of the decider.

* * * * *